US008183844B2

(12) United States Patent
Matsugaki et al.

(10) Patent No.: US 8,183,844 B2
(45) Date of Patent: May 22, 2012

(54) SWITCHING POWER SOURCE

(75) Inventors: Yoshikatsu Matsugaki, Tokyo (JP);
Masafusa Yoshida, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 695 days.

(21) Appl. No.: 11/719,608

(22) PCT Filed: Oct. 6, 2005

(86) PCT No.: PCT/JP2005/018569
§ 371 (c)(1),
(2), (4) Date: Jun. 2, 2009

(87) PCT Pub. No.: WO2006/057107
PCT Pub. Date: Jun. 1, 2006

(65) Prior Publication Data
US 2009/0237047 A1    Sep. 24, 2009

(30) Foreign Application Priority Data
Nov. 26, 2004    (JP) ................... 2004-343212

(51) Int. Cl.
*G05F 1/40*    (2006.01)
(52) U.S. Cl. ........................................ 323/282
(58) Field of Classification Search .......... 323/222, 323/265, 282–285, 315, 901; 363/49
See application file for complete search history.

(56) References Cited

U.S. PATENT DOCUMENTS

| 6,515,880 B1 * | 2/2003 | Evans et al. ............... 363/49 |
| 6,954,056 B2 | 10/2005 | Hoshino et al. |
| 7,336,060 B2 * | 2/2008 | Ito ............................ 323/299 |
| 7,405,549 B2 * | 7/2008 | Kitagawa ................... 323/282 |
| 7,586,297 B2 * | 9/2009 | Kitagawa ................... 323/282 |
| 7,619,535 B2 * | 11/2009 | Chen et al. ................ 340/635 |
| 7,782,027 B2 * | 8/2010 | Williams ................... 323/266 |
| 7,928,601 B2 * | 4/2011 | Ozawa et al. ............. 307/38 |
| 2003/0071602 A1 | 4/2003 | Ando ......................... 323/282 |
| 2003/0185028 A1 | 10/2003 | Horimoto ................... 363/97 |

FOREIGN PATENT DOCUMENTS

| CN | 1501574 A | 6/2004 |
| EP | 0 845 852 A2 | 6/1998 |
| JP | S56-164312 | 12/1981 |
| JP | 10164825 | 6/1998 |

(Continued)

OTHER PUBLICATIONS

International Search Report dated Dec. 6, 2005 in corresponding application PCT/JP2005/018569 (1 page).

(Continued)

*Primary Examiner* — Adolf Berhane
(74) *Attorney, Agent, or Firm* — Harrity & Harrity, LLP

(57) ABSTRACT

(Problem) To provide a switching power source having a stable negative voltage output. (Means for Solving the Problem) A switching power source according to the present invention comprises a switching power source controller including a soft start circuit; an output stage including a coil, a switching device, driven by an output from the switching power source controller, for controlling a current flowing in the coil, and a diode having an anode connected to an output terminal and a cathode connected to a connection point between the switching device and the coil; a voltage dividing circuit for dividing an output voltage from the soft start circuit and a voltage at the output terminal; and a soft start period adjustment circuit for adjusting a soft start period.

8 Claims, 20 Drawing Sheets

FOREIGN PATENT DOCUMENTS

| | | |
|---|---|---|
| JP | 2003-61341 | 2/2003 |
| JP | 2003-299348 | 10/2003 |
| JP | 2004-180385 | 6/2004 |

OTHER PUBLICATIONS

Japanese Office Action corresponding to JP2004-34312, mailed Jul. 2, 2010, 5 pages. (Includes partial English translation).

The China Examination Report issued in corresponding China Patent Application No. 2005800324866, dated Oct. 10, 2008, 12 pages (with English translation).

The Letter of Examination Report issued in corresponding Taiwan Patent Application No. 094134937, dated Jul. 21, 2008, 6 pages (with English translation).

* cited by examiner

100 SWITCHING POWER SOURCE

111 CLAMP CIRCUIT

201 SOFT START CIRCUIT

SOFT START PERIOD

SOFT START PERIOD

1000 SWITCHING POWER SOURCE

※ $V_o = \left(1 + \dfrac{R1}{R2}\right) V_{ref}$

1100 SWITCHING POWER SOURCE

1200 SWITCHING POWER SOURCE

US 8,183,844 B2

SWITCHING POWER SOURCE

TECHNICAL FIELD

The present invention relates to a switching power source. In particular, the present invention relates to a switching power source including a soft start circuit and outputting a predetermined negative voltage to an output side by switching a current flowing in a coil.

BACKGROUND ART

Conventionally, a soft start circuit is used for a switching power source in order to prevent ICs or the like acting as a load for a switching transistor or the switching power source from being destroyed or malfunctioning by a rush current provided for charging an output capacitor when the switching power source is turned on.

Now, FIG. 14 will be referred to. FIG. 14 shows an exemplary circuit configuration of a switching power source 1000 of a voltage buck mode (having a relationship of power source voltage (Vcc) >output voltage (Vo); also referred to as a "Buck Mode") for outputting a positive voltage. The conventional switching power source 1000 shown in FIG. 14 includes a soft start circuit 1001, a triangular wave generation circuit 1002, an error amplifier 1003, a comparator 1004, a drive unit 1005, a switching transistor Tr, a diode D, a coil L, a capacitor C, and resistors R1 and R2. An output voltage from the soft start circuit 1001 is input as a reference voltage Vref for the error amplifier 1003. The error amplifier 1003 is supplied with the output voltage Vref from the soft start circuit 1001 and a voltage obtained by dividing the output voltage Vo by the resistors R1 and R2. A source or a drain of the switching transistor Tr is supplied with Vcc. The soft start circuit 1001 includes a clamp circuit (not shown) for controlling the output voltage therefrom such that the output voltage does not exceed Vref.

When the switching power source 1000 operates normally, the error amplifier 1003 is in a virtual short state in which the two inputs thereof (non-inverted input and inverted input) have substantially the same potential. When the input impedance of the error amplifier 1003 is sufficiently high, the following mathematical expression (1) is fulfilled.

Mathematical Expression 1

$$V_o = (1 + R1/R2) V_{ref} \quad (1)$$

As is clear from mathematical expression (1), the output voltage Vo is in proportion to the reference voltage Vref. Therefore, by increasing the reference voltage Vref until reaching a certain level after the power is turned on, the output Vo in proportion to the reference voltage Vref also gradually increases.

FIG. 15 is an operation waveform diagram of the conventional switching power source 1000. As understood from FIG. 15, the power source voltage Vcc is turned on at time t1 and the reference voltage Vref is gradually increased until reaching a certain level, so that the output voltage Vo in proportion to the reference voltage Vref also gradually increases. This time period corresponds to a soft start period (t2-t1).

Now, FIG. 16 will be referred to. FIG. 16 shows an exemplary circuit configuration of another conventionally used switching power source 1100 of the voltage buck mode for outputting a positive voltage. The conventional switching power source 1100 shown in FIG. 16 includes a soft start circuit 1101, a triangular wave generation circuit 1102, an error amplifier 1103, a comparator 1104, a drive unit 1105, a switching transistor Tr, a diode D, a coil L, a capacitor C, and resistors R1 and R2. The error amplifier 1103 is a three-input error amplifier, and is supplied with an output voltage from the soft start circuit 1101, a reference voltage Vref, and a voltage obtained by dividing an output voltage Vo by the resistors R1 and R2. A source or a drain of the switching transistor Tr is supplied with Vcc.

The switching power source 1100 acts in substantially the same manner as the switching power source 1000, except that whereas the soft start circuit 1001 in the switching power source 1000 requires a clamp circuit, the soft start circuit 1101 in the switching power source 1100 does not require a clamp circuit.

FIG. 17 is an operation waveform diagram of the soft start circuit 1101. Immediately after the power is turned on at time t1, the output voltage of the soft start circuit 1101 changes in proportion to time because the voltage of the capacitor in the soft start circuit 1101 is 0V. The time period until the output from the soft start circuit 1101 reaches the reference voltage Vref (t2-t1) corresponds to a soft start period.

FIG. 18 is an operation waveform diagram of the conventional switching power source 1100. As understood from FIG. 18, the power source voltage Vcc is turned on at time t1 and the reference voltage Vref is gradually increased until reaching a certain level, so that the output voltage Vo in proportion to the reference voltage Vref also gradually increases. This time period corresponds to the soft start period (t2-t1). The output voltage Vo fulfills mathematical expression (1) shown above.

Another conventionally used switching power source adopts a soft start system by which the output voltage is gradually increased by gradually extending the time period in which the switching transistor is in an ON state (On Duty) from the start of the circuit. Such a soft start system is referred to as the "DTC (Dead Time Control) system". Patent document 1 mentioned below discloses such DTC system soft start.

FIG. 19 will be referred to. FIG. 19 shows an exemplary circuit configuration of a conventional switching power source 1200 of the voltage buck mode for outputting a positive voltage. The switching power source 1200 adopts the DTC system soft start. The conventional switching power source 1200 shown in FIG. 19 includes a soft start circuit 1201, a triangular wave generation circuit 1202, an error amplifier 1203, a comparator 1204, a drive unit 1205, a switching transistor Tr, a diode D, a coil L, a capacitor C, and resistors R1 and R2. The error amplifier 1203 is a two-input error amplifier, and is supplied with a voltage obtained by dividing an output voltage Vo by the resistors R1 and R2 and a reference voltage Vref. The comparator 1204 is a three-input comparator, and is supplied with an output from the error amplifier 1203, an output from the soft start circuit 1201, and an output from the triangular wave generation circuit 1202. A source of the switching transistor Tr is supplied with Vcc.

FIG. 20 is an operation waveform diagram of the switching power source 1200. As shown in FIG. 20, the output voltage Vo from the switching power source is gradually increased by gradually increasing the voltage at an output terminal of the comparator 1204 for a certain time period. The output voltage Vo fulfills mathematical expression (1) shown above. The threshold level shown in FIG. 20 is determined by the input voltage Vcc and the output voltage Vo.

The switching power source 1200 has the following drawback. Until the soft start is completed, the feedback function is only operative to the comparator 1204. Immediately before the soft start is completed to allow the feedback function to be normally operative and thus the output voltage Vo becomes stable, an over voltage is generated temporarily by the overshoot of the output voltage Vo.

Patent document 1: Japanese Laid-Open Patent Publication No.

DISCLOSURE OF THE INVENTION

Problems to be Solved by the Invention

Today, negative voltage power sources are required mainly in the applications of flat panel display and the like. Also, ICs for driving displays become more and more reduced in size in order to realize higher precision, and therefore are more liable to the influences of an over voltage or the timing for starting the power source. For these reasons, a switching power source having a soft start function and outputting a negative voltage is required.

The above-described switching power sources 1000, 1100 and 1200 all have a soft start function, but are of a voltage buck mode for outputting a positive voltage. A switching power source circuit of a voltage boost mode (having a relationship of power source voltage (Vcc) <output voltage (Vo); also referred to as a "Boost Mode") improved from a voltage buck mode switching power source is conventionally well used. However, no such voltage buck mode switching power source has been improved to be of an inverting mode for outputting a negative voltage.

The present invention made for solving the above-described problems provides a switching power source having a soft start function.

Means for Solving the Problems

A switching power source according to the present invention includes a circuit having a soft start function. Owing to this, the switching transistor is prevented from being destroyed by a rush current provided for charging the output capacitor when the switching power source is turned on, and thus a stable negative voltage output can be provided.

The present invention provides a switching power source, comprising: a switching power source controller including a soft start circuit; an output stage including a coil, a switching device, driven by an output from the switching power source controller, for controlling a current flowing in the coil, and a diode having an anode connected to an output terminal and a cathode connected to a connection point between the switching device and the coil; a voltage dividing circuit for dividing an output voltage from the soft start circuit and a voltage at the output terminal; and a soft start period adjustment circuit for adjusting a soft start period.

The switching power source controller further comprises an error amplifier, a comparator, a triangular wave generation circuit, and a driving circuit.

The present invention provides a switching power source, comprising: a switching power source controller including an error amplifier, a comparator, a triangular wave generation circuit, and a driving circuit, wherein the comparator is connected to a soft start circuit and has a P-channel transistor or a PNP transistor in an input section thereof; an output stage including a coil, a switching device, driven by an output from the switching power source controller, for controlling a current flowing in the coil, and a diode having an anode connected to an output terminal and a cathode connected to a connection point between the switching device and the coil; a voltage dividing circuit for dividing an output voltage from the soft start circuit and a voltage at the output terminal; and a soft start period adjustment circuit for adjusting a soft start period.

The present invention provides a switching power source, comprising: a switching power source controller including a soft start circuit; a plurality of output stages including an output stage for outputting a negative voltage, wherein the output stage for outputting a negative voltage includes a coil, a switching device, driven by an output from the switching power source controller, for controlling a current flowing in the coil, and a diode having an anode connected to an output terminal and a cathode connected to a connection point between the switching device and the coil; a voltage dividing circuit for dividing an output voltage from the soft start circuit and a voltage at the output terminal; a soft start period adjustment circuit for adjusting a soft start period; and a switching circuit for switching a rising sequence of the plurality of output stages.

The soft start circuit may comprise a clamp circuit. The error amplifier may have a clamp function for the soft start circuit.

Effect of the Invention

The present invention provides a switching power source having a soft start function and also outputting a stable negative voltage. In addition, a switching power source according to the present invention allows the feedback function in the circuit to be operative from immediately after the power is turned on, prevents the overshoot on the negative side for outputting a negative voltage when the power is turned on, and thus protects the circuit elements on the load circuit side for outputting the negative voltage from being damaged. Therefore, the decrease in the withstand voltage caused by the size reduction of the circuit elements can be handled.

A switching power source according to the present invention can stably output a plurality of voltages and also easily change the rising sequence thereof.

DESCRIPTION OF THE REFERENCE NUMERALS

100 switching power source; 101 soft start circuit; 102 triangular wave generation circuit; 103 error amplifier; 104 comparator; 105 drive unit; 106 voltage dividing circuit; 107 switching power source controller; 108 output stage; 110 constant current source; 111 clamp circuit; 120 operation amplification circuit; 200 switching power source; 201 soft start circuit; 202 triangular wave generation circuit; 203 error amplifier; 204 comparator; 205 drive unit; 206 voltage dividing circuit; 207 switching power source controller; 208 output stage; 210 constant current source

BEST MODE FOR CARRYING OUT THE INVENTION

In this embodiment, an exemplary switching power source according to the present invention will be described. A switching power source shown in FIG. 1 adopts an inverting mode for outputting a negative voltage, and outputs a reference voltage, which is input to the error amplifier, from a soft start circuit. Owing to such an arrangement, the feedback function in the circuit is operative from immediately after the power is turned on, the overshoot on the negative side for outputting a negative voltage when the power is turned on is prevented, and thus the circuit elements on the load circuit side for outputting the negative voltage is protected from being damaged.

Figure 1:
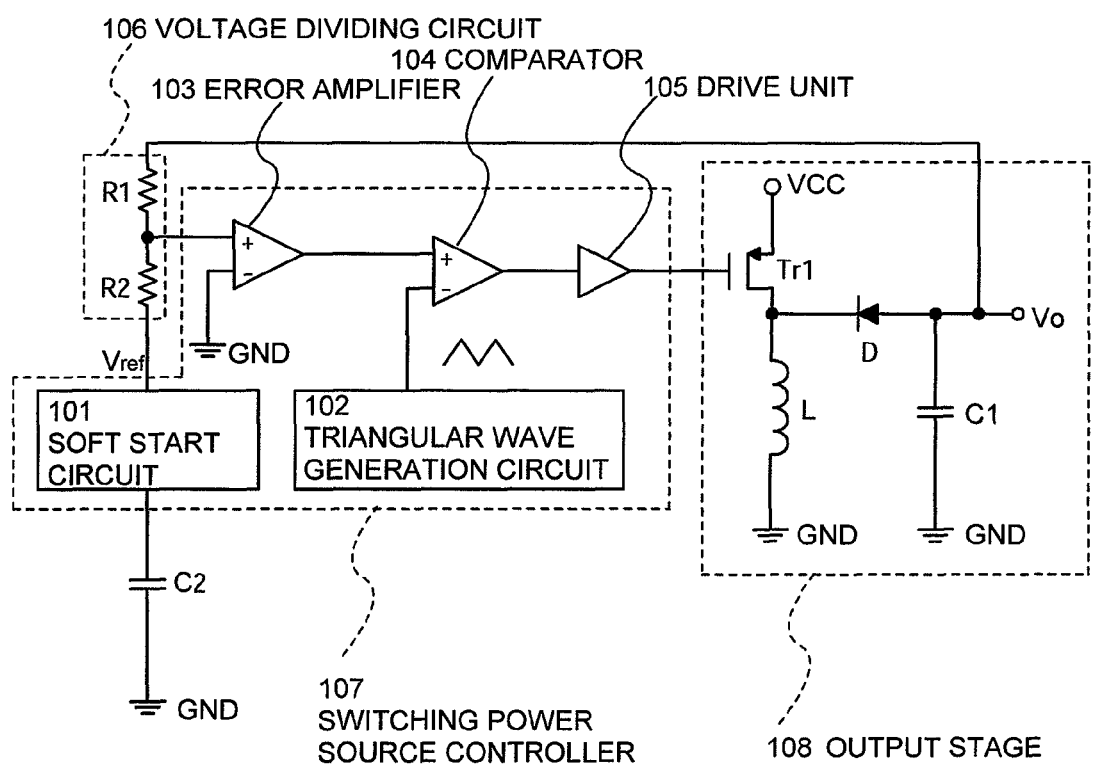
FIG. 1 shows a circuit configuration of a switching power source in one embodiment according to the present invention.

FIG. 1 shows a circuit configuration of a switching power source (switching circuit) 100. The switching power source (switching circuit) 100 includes a soft start circuit 101, a triangular wave generation circuit 102, an error amplifier (error amplification circuit) 103, a comparator (comparison circuit) 104, a drive unit (driving circuit) 105, a switching transistor (switching device) Tr1, a diode D, a coil L, capacitors C1 and C2, and a voltage dividing circuit 106 formed of resistors R1 and R2. A switching power source controller 107 includes the soft start circuit 101, the triangular wave generation circuit 102, the error amplifier 103, the comparator 104 and the drive unit 105. An output stage 108 includes the switching transistor Tr1, the diode D, the coil L and the capacitor C1. In this example, the voltage diving circuit 106 is formed of two resistors R1 and R2, but the present invention is not limited to this circuit. The voltage diving circuit 106 may be any circuit which has a function of dividing an output voltage from the soft start circuit 101 and an output voltage (Vo) at an output terminal Vo. A variable resistor may be used for each of the resistors R1 and R2. The capacitor C2 is a soft start period adjustment circuit.

Figure 2:
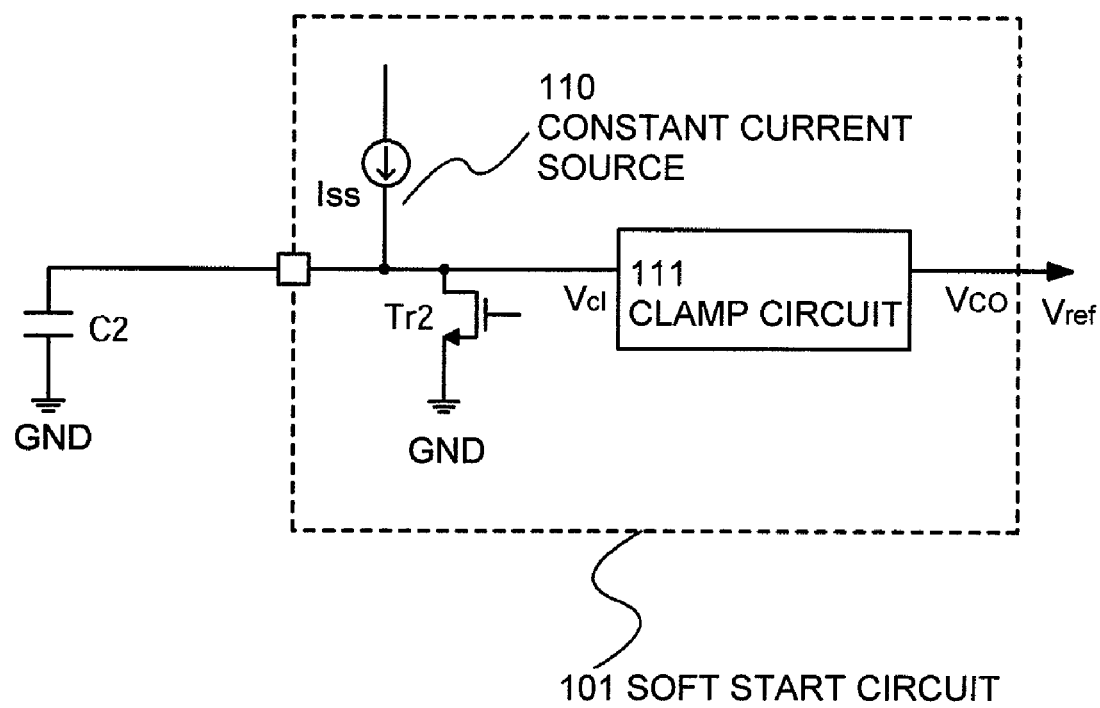
FIG. 2 shows a circuit configuration of a soft start circuit 101 in one embodiment.

Next, FIG. 2 will be referred to. FIG. 2 shows a circuit configuration of the soft start circuit 101 in the switching power source 100. The soft start circuit 101 in the switching power source 100 includes a constant current source 110, a switching transistor (switching device) Tr2, and a clamp circuit 111. The capacitor C2 is not included in the soft start circuit 101 in the switching power source 100, but may be included in the soft start circuit 101. The capacitor C2 is for adjusting the soft start period and acts as a soft start period adjustment circuit.

Figure 4:
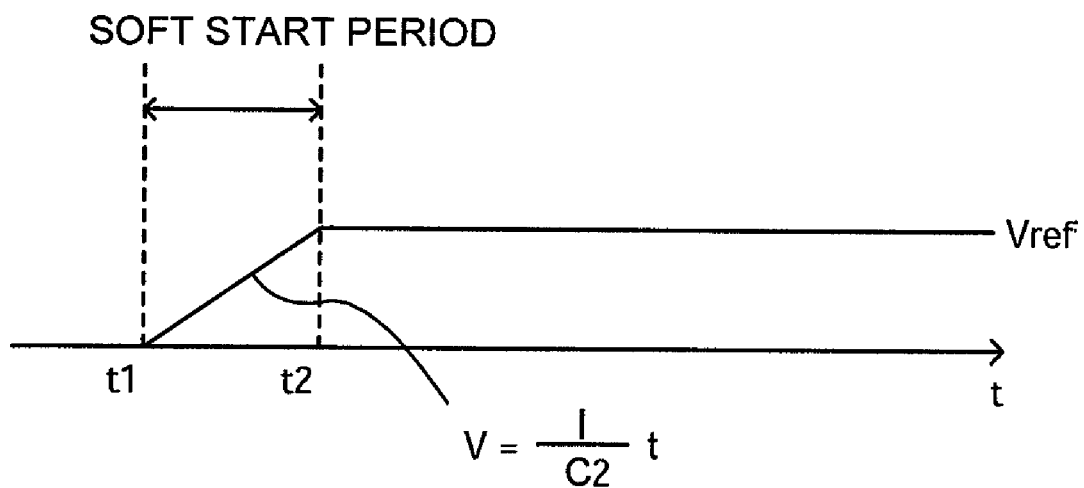
FIG. 4 is a waveform diagram of the soft start circuit 101 in one embodiment.

In the soft start circuit 101, the level of charge accumulated in the capacitor C2 when the power is turned on is zero. Therefore, the potential on the upper side of the capacitor C2 is 0V. After the power is turned on, the capacitor C2 is charged with a constant current from the constant current source 110, and therefore the potential on the upper side of the capacitor C2 increases in proportion to time at a certain ratio as shown in FIG. 4. After reaching Vref, the potential is maintained at a certain voltage (=Vref) by the function of the clamp circuit 111.

Figure 3:
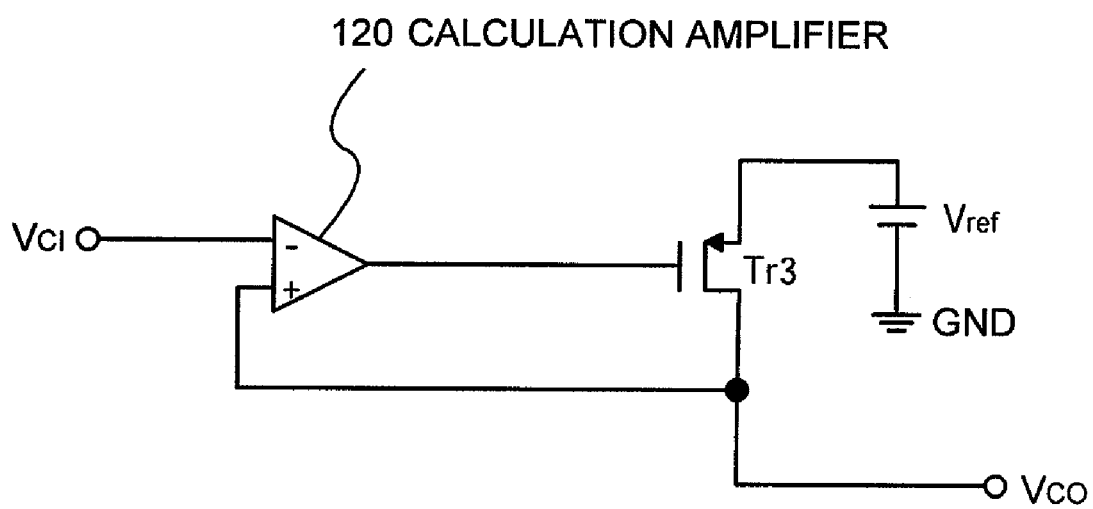
FIG. 3 shows a circuit configuration of a clamp circuit 111 in one embodiment.

Now, FIG. 3 will be referred to. FIG. 3 shows a circuit configuration of the clamp circuit 111 in the switching power source 100. The clamp circuit 111 includes an operation amplifier (operation amplification circuit) 120 and a switching transistor (switching device) Tr3. An inverted input (−) of the operation amplifier is supplied with a potential VCI on the upper side of the capacitor C2. An output from the operation amplifier 120 drives the switching device Tr3. Upon receipt of the output from the operation amplifier 120, the switching device Tr3 controls the output voltage from the voltage source to be a predetermined level Vref and outputs such a voltage as an output voltage VCO. The output voltage VCO is fed back to a non-inverted input (+) of the operation amplifier 120.

In the clamp circuit 111, the following mathematical expression (2) is fulfilled. The clamp circuit 111 controls the output voltage from the soft start circuit 1001 such that the output voltage does not exceed Vref.

Mathematical Expression 2

$$V_o = V_{CI}(V_{CI} < V_{ref})$$

$$V_o = V_{ref}(V_{CI} > V_{ref}) \qquad (2)$$

Here, returning to FIG. 1, an operation of the switching power source 100 will be described. The output voltage Vo is divided by the output voltage from the soft start circuit 101. Namely, the potential difference between the output voltage from the soft start circuit 101 and the output voltage (Vo) at the output terminal Vo is divided by the resistors R1 and R2. The divided voltage (the output from the voltage dividing circuit 106) is input to the error amplifier 103. The error amplifier 103 amplifies the potential difference between the output from the voltage dividing circuit 106 and the reference voltage (=GND (0V)) of the error amplifier 103, and outputs the resultant potential difference. The output from the error amplifier 103 is input to a non-inverted input (+) of the comparator 104. An inverted input (−) of the comparator 104 is supplied with a triangular wave (or a sawtooth wave) generated by the triangular wave generation circuit 102. The comparator 104 compares the output from the error amplification circuit 103 and the triangular wave, and outputs the result to the drive unit 105 as a pulse. The drive unit 105 receives the output from the comparator 104 as an input and drives the switching device Tr1. Based on the output from the drive unit 105, the switching device Tr1 turns on or off the current flowing in the coil L. When the switching device Tr1 is on, electric energy is accumulated in the coil L. When the switching device Tr1 is off, the electric energy accumulated in the coil L is output as power from the output terminal Vo via the diode D. The circuit is configured such that in this state, the electric energy accumulated in the coil is returned to the coil as a current via the GND, an external load circuit (not shown), the output terminal Vo, an anode of the diode D and a cathode of the diode D. When the switching device is on, the cathode of the diode D has the voltage Vcc and so the diode D is non-conductive. The circuit is configured such that in this state, the current flows from the lower terminal of the capacitor C1 to the upper terminal of the capacitor C1 via the GND, an external load circuit and the output terminal Vo. Therefore, the output voltage can be generated stably. In either case, the current from the GND flows to the output terminal Vo, and thus a negative voltage is generated at the output terminal Vo. The output voltage Vo is fed back to the voltage dividing circuit 106, so that a feedback circuit is formed.

In the switching power source 100, the feedback circuit starts becomes operative immediately after the power is turned on. By the function of the feedback circuit, the potentials at the two inputs of the error amplification circuit 103 become substantially equal to each other (virtual short), and the output voltage Vo follows mathematical expression (3) below.

Mathematical Expression 3

$$V_o = -(R1/R2)V_{ref} \quad (3)$$

Figure 5:
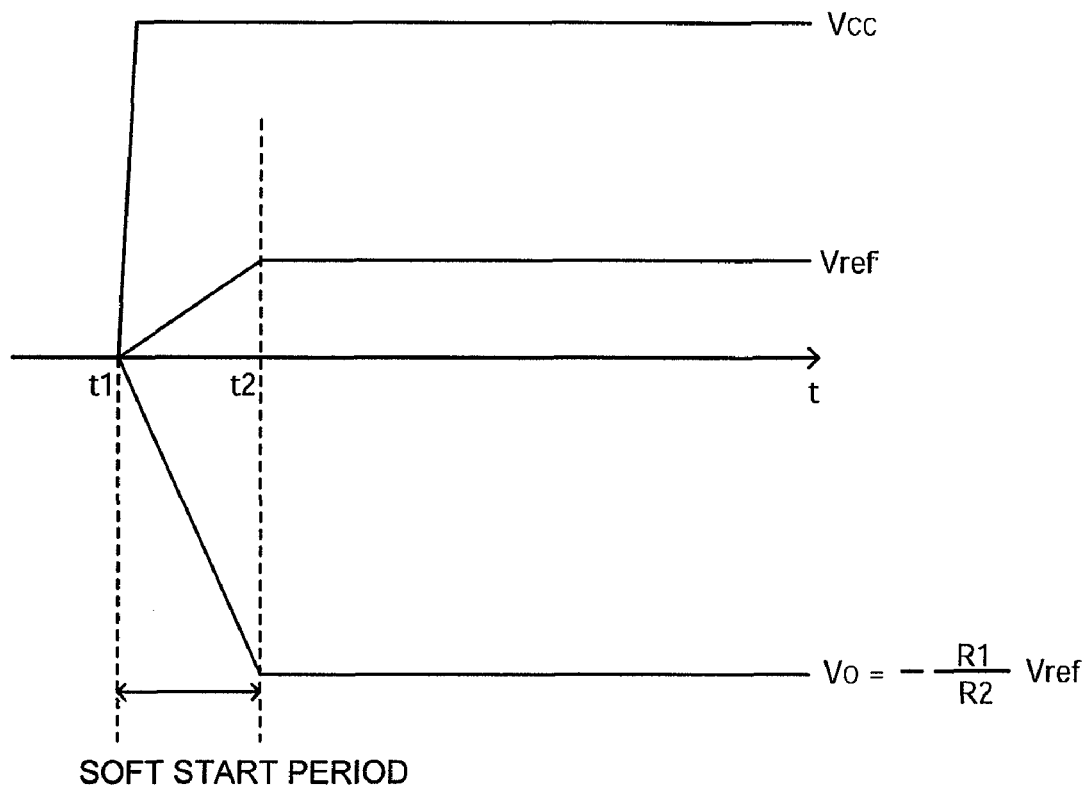
FIG. 5 is a waveform diagram of a switching power source 100 in one embodiment according to the present invention.

Accordingly, by changing the output voltage from the soft start circuit as shown in FIG. 4, a negative voltage can be output during the soft start period as shown in FIG. 5.

FIG. 5 is a waveform diagram of the switching power source 100. As shown in FIG. 5, the output voltage from the soft start circuit changes as shown in FIG. 4 immediately after the power is turned on, and the output voltage Vo changes accordingly. After the soft start period (t2-t1) is finished, a stable negative voltage Vo is obtained.

Figure 6:
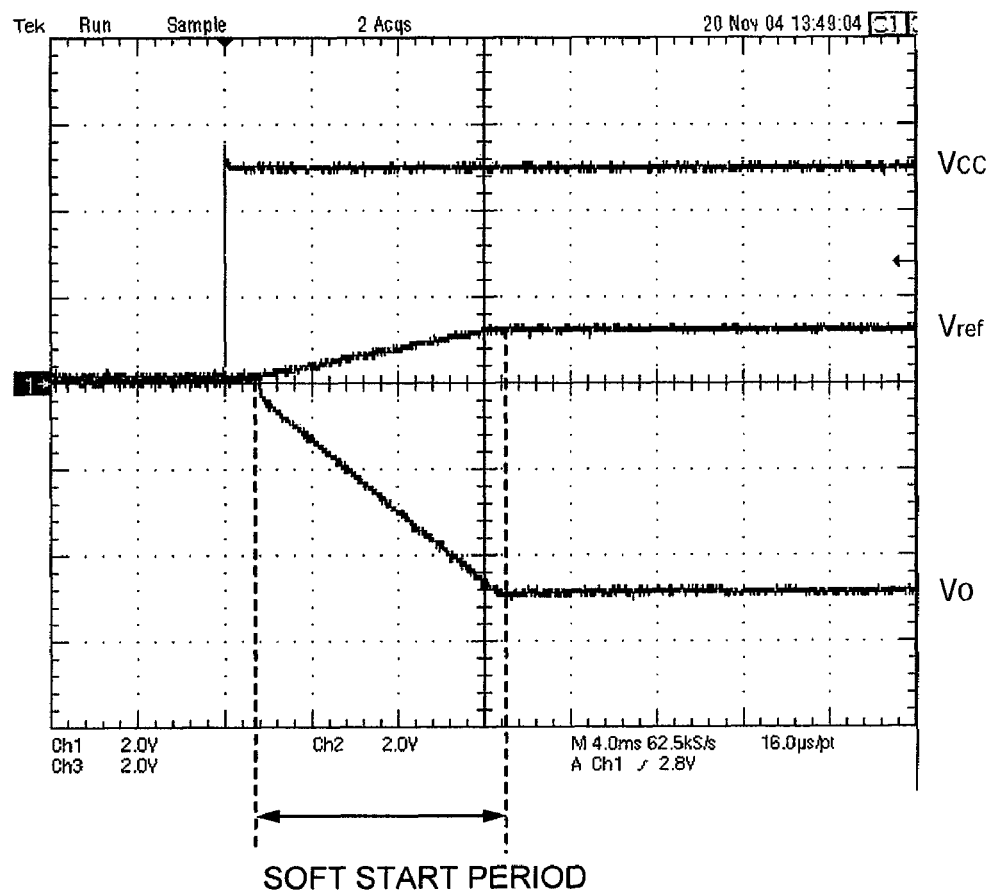
FIG. 6 shows experimental results regarding the switching power source 100 in one embodiment according to the present invention.

FIG. 6 shows experimental results regarding the switching power source 100. Here, the power source voltage Vcc was 5V, Vref was 1.2V, and the output voltage Vo was −5V. It is understood that after the soft start period of about 12 msec., a stable negative voltage Vo (=−5V) is output.

The present invention provides a switching power source having a soft start function and also outputting a stable negative voltage. In addition, the feedback function in the circuit is operative from immediately after the power is turned on, the overshoot on the negative side for outputting the negative voltage when the power is turned on is prevented, and thus the circuit elements on the load circuit side for outputting the negative voltage is protected from being damaged. Therefore, the decrease in the withstand voltage caused by the size reduction of the circuit elements can be handled.

Hereinafter, another exemplary switching power source according to the present invention will be described.

Figure 7:
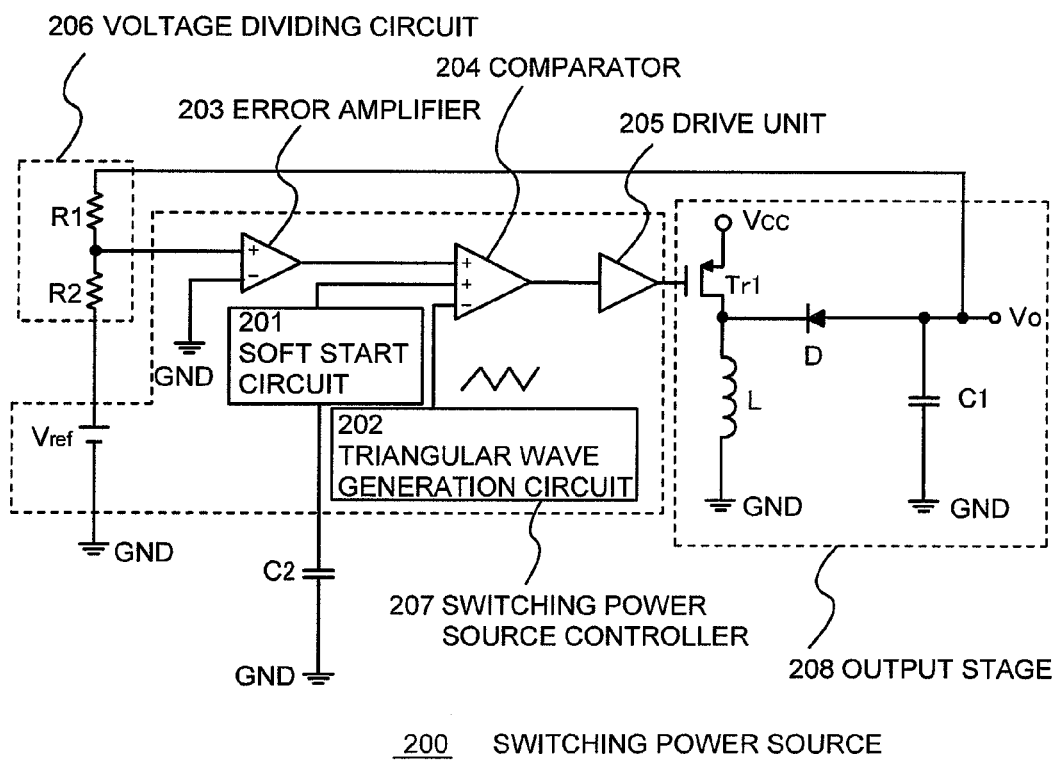
FIG. 7 shows a circuit configuration of a switching power source 200 in one embodiment according to the present invention.

FIG. 7 will be referred to. FIG. 7 shows a circuit configuration of a switching power source (switching circuit) 200. The switching power source (switching circuit) 200 includes a soft start circuit 201, a triangular wave generation circuit 202, an error amplifier (error amplification circuit) 203, a comparator (comparison circuit) 204, a drive unit (driving circuit) 205, a switching transistor (switching device) Tr1, a diode D, a coil L, capacitors C1 and C2, and a voltage dividing circuit 206 formed of resistors R1 and R2. The comparator 204 includes a P-channel transistor or a PNP transistor in an input section thereof. A switching power source controller 207 includes the soft start circuit 201, the triangular wave generation circuit 202, the error amplifier 203, the comparator 204 and the drive unit 205. An output stage 208 includes the switching transistor Tr1, the diode D, the coil L and the capacitor C1. In the switching power source 200, the voltage diving circuit 206 is formed of two resistors R1 and R2, but the present invention is not limited to this circuit. The voltage diving circuit 206 may be any circuit which has a function of dividing an output voltage from the soft start circuit 201 and an output voltage (Vo) at the output terminal Vo. A variable resistor may be used for each of the resistors R1 and R2. The capacitor C2 is used as a soft start period adjustment circuit.

Figure 8:
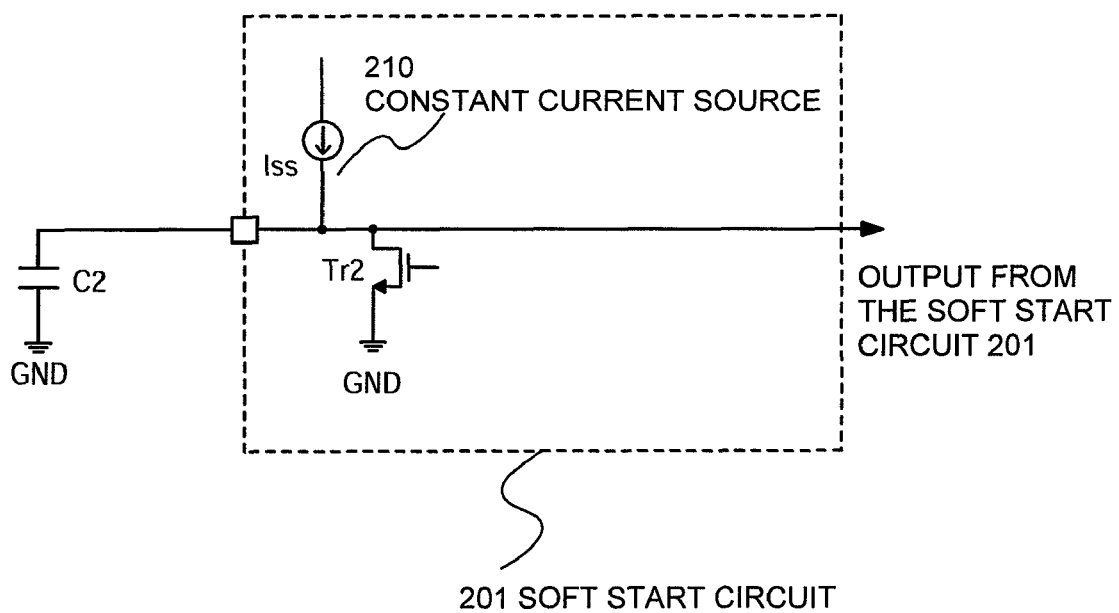
FIG. 8 shows a circuit configuration of a soft start circuit 201 in one embodiment.

Next, FIG. 8 will be referred to. FIG. 8 shows a circuit configuration of the soft start circuit 201 in the switching power source 200. The soft start circuit 201 includes a constant current source 210 and a switching transistor (switching device) Tr2. The capacitor C2 is not included in the soft start circuit 201 in the switching power source 200, but may be included in the soft start circuit 201. The capacitor C2 is for adjusting the soft start period and acts as a soft start period adjustment circuit.

Here, FIG. 7 will be referred to again. After the power is turned on, the voltage Vref rises immediately. At this point, the output voltage Vo is still 0V. Accordingly, the output voltage from the voltage dividing circuit 206 is a positive voltage sufficiently higher than 0V. This positive output voltage is input to a non-inverted input (+) of the error amplification circuit 203, and thus the error amplification circuit 203 outputs a voltage having a high positive level (=positive saturation voltage).

Figure 9:
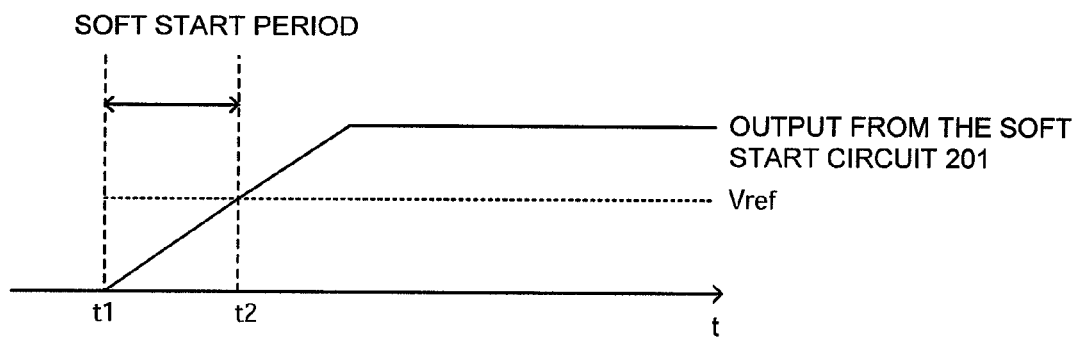
FIG. 9 is a waveform diagram of the soft start circuit 201 in one embodiment.

The comparator 204 compares the output voltage from the error amplification circuit 203, an output from the soft start circuit 201, and an output voltage from the triangular wave generation circuit 202. When a P-channel FET or a PNP transistor is used for a differential amplification circuit of an input section of the comparator 204, the comparator 204 acts such that one of the two non-inverted inputs (+) which has a lower voltage level is effective. Namely, the comparator 204 acts as a clamp circuit for the soft start circuit 201. FIG. 9 is a waveform diagram of the soft start circuit 201. When the power is turned on, the output from the soft start circuit 201 is 0V as shown in FIG. 9. Therefore, during the soft start period (t2-t1), the output from the soft start circuit 201 is effective and is output. During the soft start period, the feedback circuit in the switching power source 200 is not operative.

Figure 10:
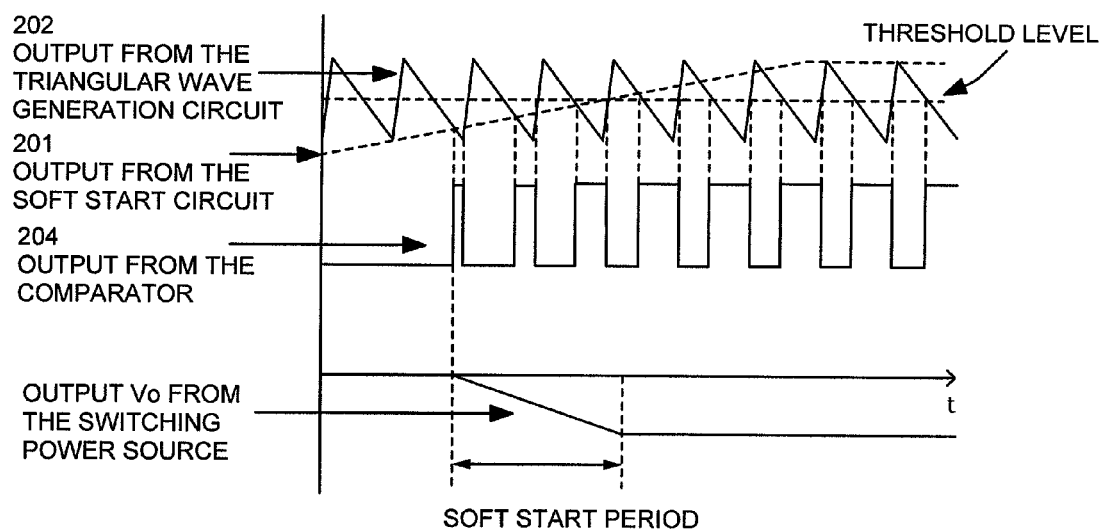
FIG. 10 is a waveform diagram of the switching power source 200 in one embodiment.

FIG. 10 is an operation waveform diagram of the switching power source 200. As shown in FIG. 10, as the output voltage from the soft start circuit 201 gradually increases, the pulse width of the output from the comparator 204 is gradually extended. When the output voltage Vo reaches a predetermined level, the output from the voltage dividing circuit 206 becomes substantially 0V. When the output voltage from the error amplification circuit 203 decreases from the saturation level to a level lower than the output voltage from the soft start circuit 201, the soft start period is finished at time t2. At the same time as the termination of the soft start period (time t2), the feedback circuit of the switching power source 200 starts operating.

The switching power source 200 has a soft start function and also outputs a stable negative voltage.

Hereinafter, still another exemplary switching power source according to the present invention will be described.

Figure 11:
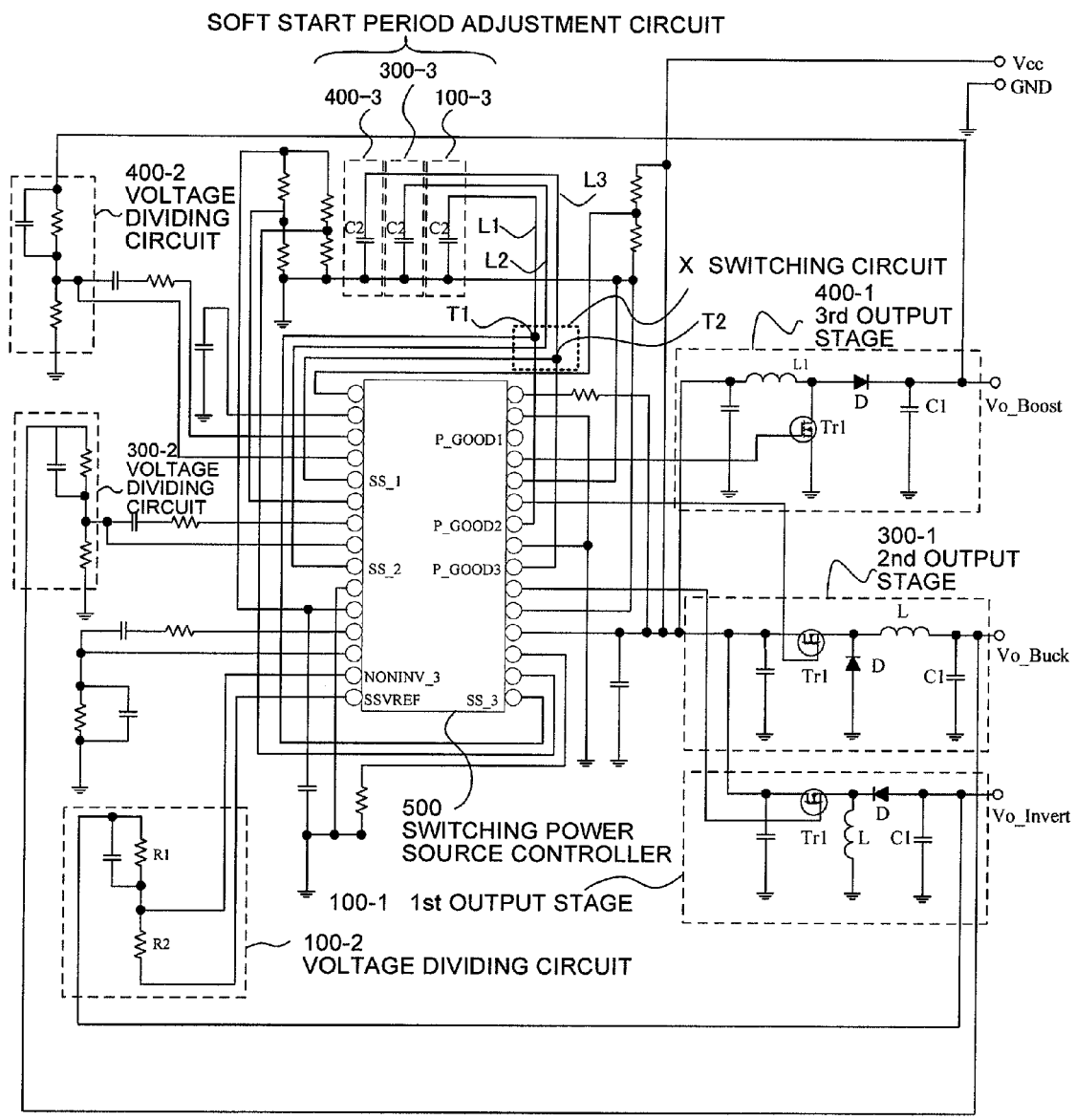
FIG. 11 shows an exemplary circuit configuration of a switching power source controller in one embodiment according to the present invention.

FIG. 11 will be referred to. FIG. 11 shows an exemplary circuit configuration of a switching power source 600. A first output stage 100-1, a voltage dividing circuit 100-2 (resistors R1 and R2), a soft start period adjustment circuit 100-3 (capacitor C2), and a switching power source controller 500 are included in the switching power source 100 for outputting a negative voltage. A second output stage 300-1, a voltage dividing circuit 300-2 (resistors R1 and R2), a soft start period adjustment circuit 300-3 (capacitor C2), and the switching power source controller 500 are included in a voltage buck mode power source for outputting a positive voltage. A third output stage 400-1, a voltage dividing circuit 400-2 (resistors R1 and R2), a soft start period adjustment circuit 400-3 (capacitor C2), and the switching power source controller 500 are included in a voltage boost mode power source for outputting a positive voltage. The switching power source controller 500 includes a soft start circuit, an error amplifier, a comparator and a drive unit. In FIG. 11, a soft start adjustment circuit (capacitor C2) for adjusting the soft start period of each output power source is externally provided. The capacitors C2 may be built in the switching power source controller 500 or may be externally provided.

As shown in FIG. 11, the switching power source controller 500 has three voltage outputs, i.e., a negative voltage output Vo_Invert, a voltage buck mode positive voltage output Vo_Buck, and a voltage boost mode positive voltage output Vo_Boost. The order in which these three voltage outputs rise can be freely changed by changing the connection in section X shown in FIG. 11.

In FIG. 11, P_GOOD3 of the switching power source controller 500 is connected to line L3 at T2, and P_GOOD2 of the switching power source controller 500 is connected to line L1 at T1. In this case, the three voltages are output in the order of the voltage buck mode positive voltage output Vo_Buck, the negative voltage output Vo_Invert and the voltage boost mode positive voltage output Vo_Boost. By changing the line connection in section X (switching circuit) as follows, the rising sequence (the order of rising) of the three voltage outputs can be changed.

(1) Vo_Buck→Vo_Invert→Vo_Boost:P_GOOD2 is connected to line L1, and P_GOOD3 is connected to line L3; (2) Vo_Buck→Vo_Boost→Vo_Invert:P_GOOD2 is connected to line L3, and P_GOOD1 is connected to line L1; (3) Vo_Invert→Vo_Buck→Vo_Boost:P_GOOD3 is connected to line L2, and P_GOOD2 is connected to line L3; (4) Vo_Invert→Vo_Boost→Vo_Buck:P_GOOD3 is connected to line L3, and P_GOOD1 is connected to line L2; (5) Vo_Boost→Vo_Invert→Vo_Buck:P_GOOD1 is connected to line L1, and P_GOOD3 is connected to line L2; (6) Vo_Boost→Vo_Buck→Vo_Invert:P_GOOD1 is connected to line L2, and P_GOOD2 is connected to line L1.

Among the three power sources shown in FIG. 11, either Vo_Boost or Vo_Buck may be changed such that both are Vo_Boost or both are Vo_Buck. In accordance with whether both are Vo_Boost or both are Vo_Buck, an external circuit needs to be changed.

Figure 12:
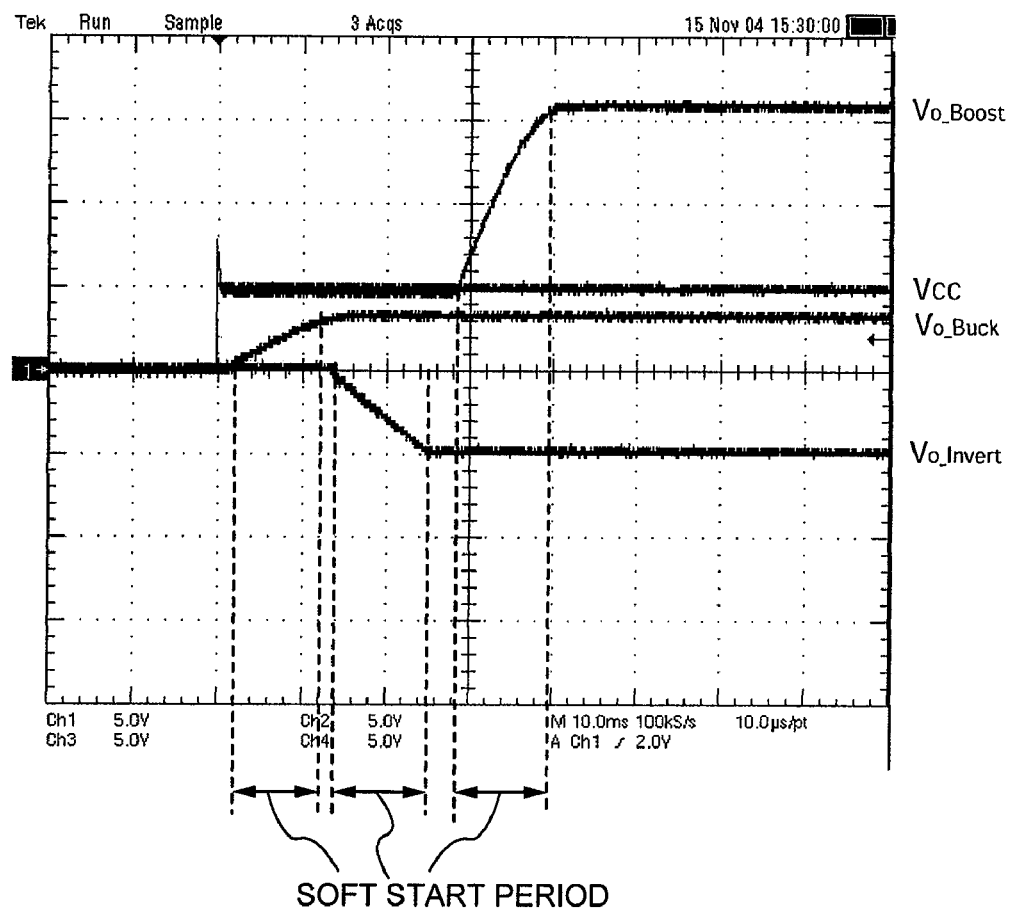
FIG. 12 shows experimental results regarding the voltage output from a switching power source in one embodiment according to the present invention.
Figure 13:
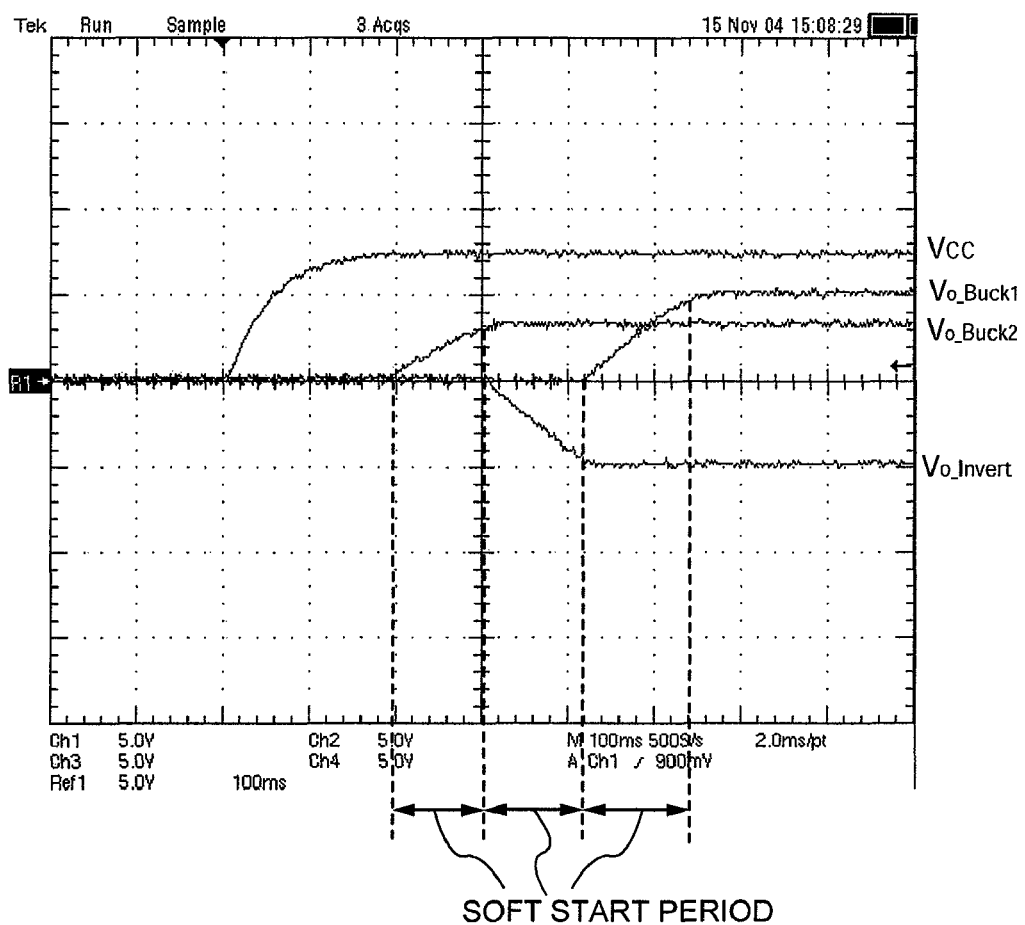
FIG. 13 shows experimental results regarding the voltage output from a switching power source in one embodiment according to the present invention.
Figure 14:
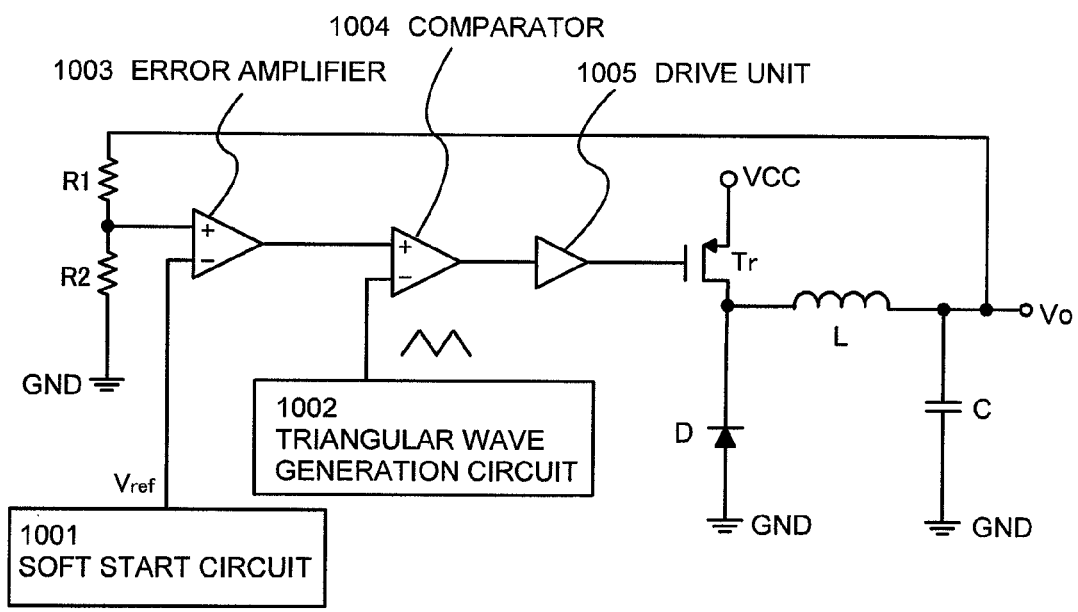
FIG. 14 shows an exemplary circuit configuration of a conventional switching power source 1000.
Figure 15:
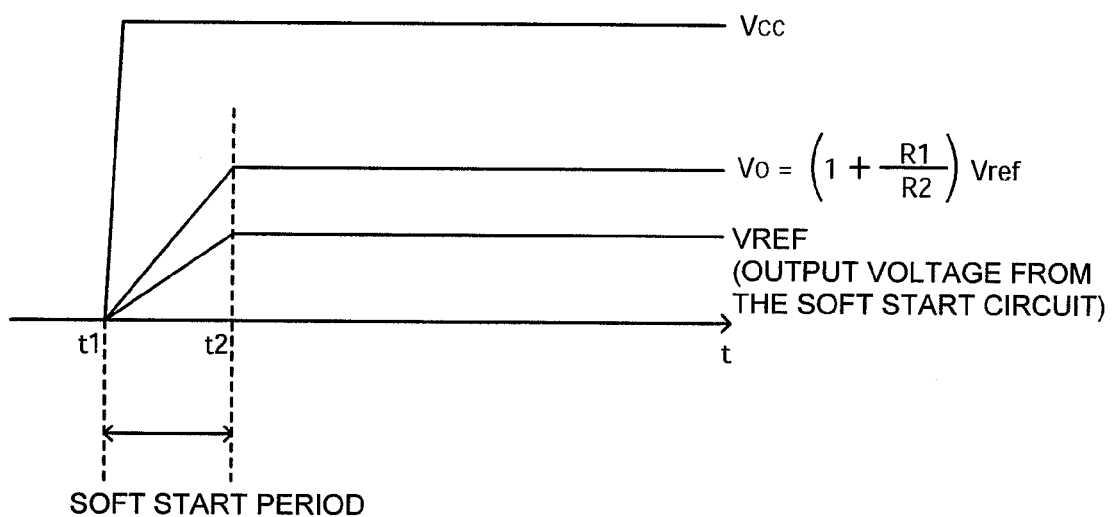
FIG. 15 is an operation waveform diagram of the conventional switching power source 1000.
Figure 16:
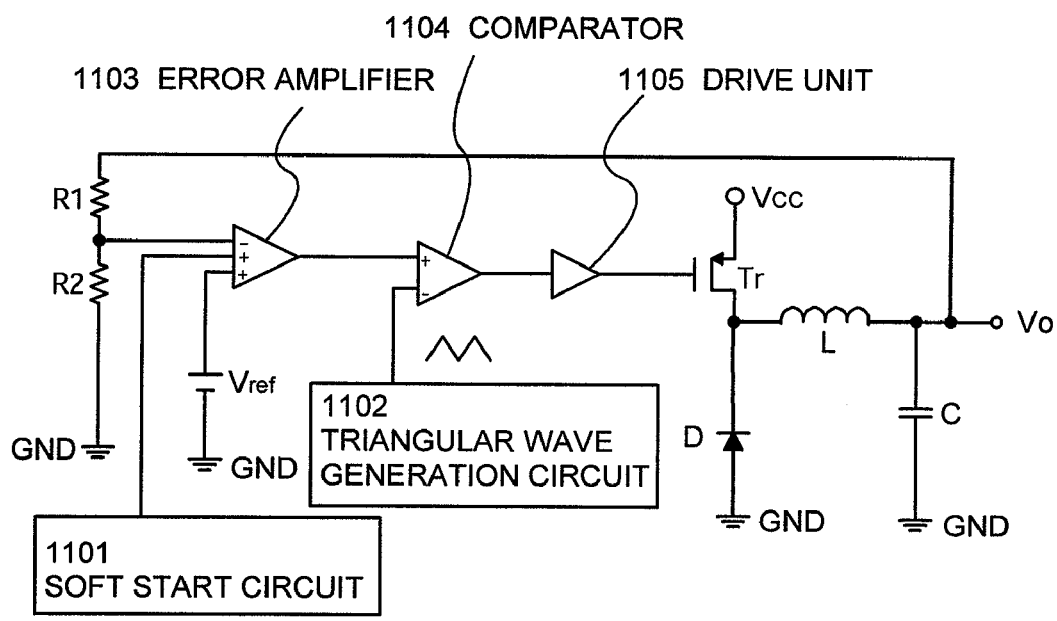
FIG. 16 shows an exemplary circuit configuration of a conventional switching power source 1100.
Figure 17:
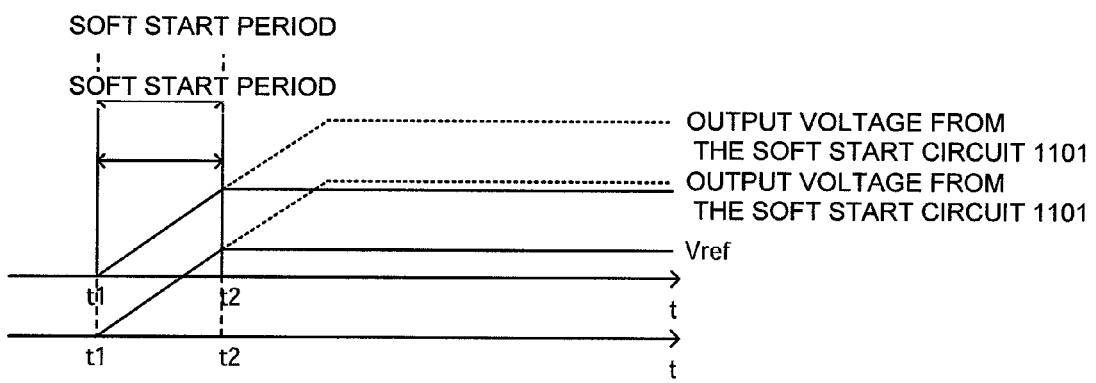
FIG. 17 is an operation waveform diagram of a soft start circuit 1101.
Figure 18:
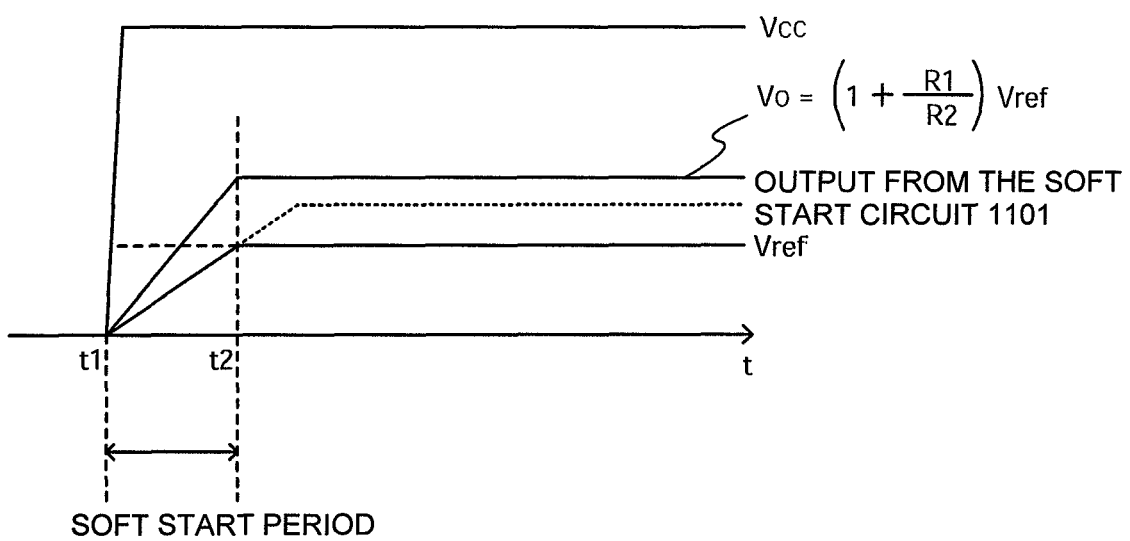
FIG. 18 is an operation waveform diagram of the conventional switching power source 1100.
Figure 19:
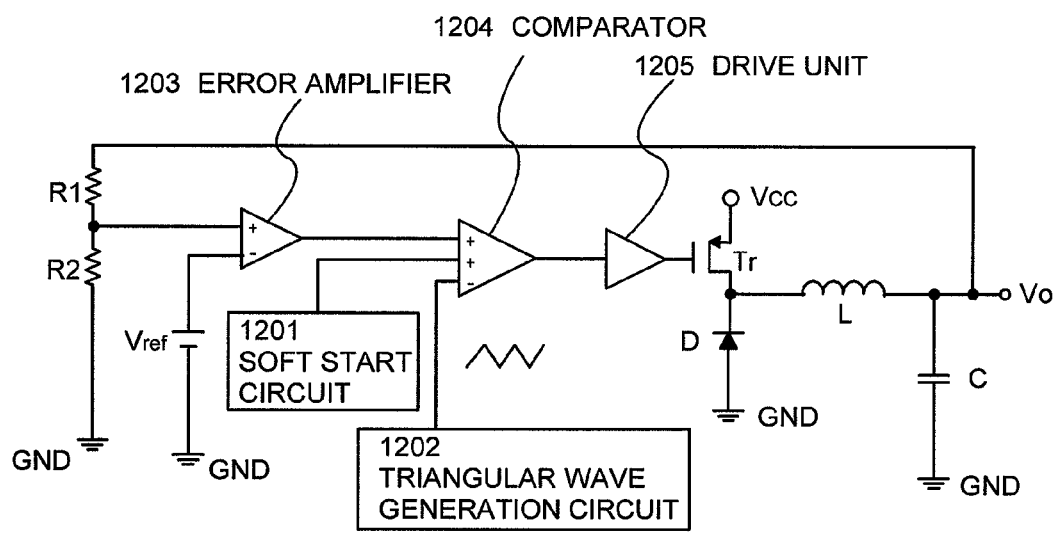
FIG. 19 shows an exemplary circuit configuration of a conventional switching power source 1200.
Figure 20:
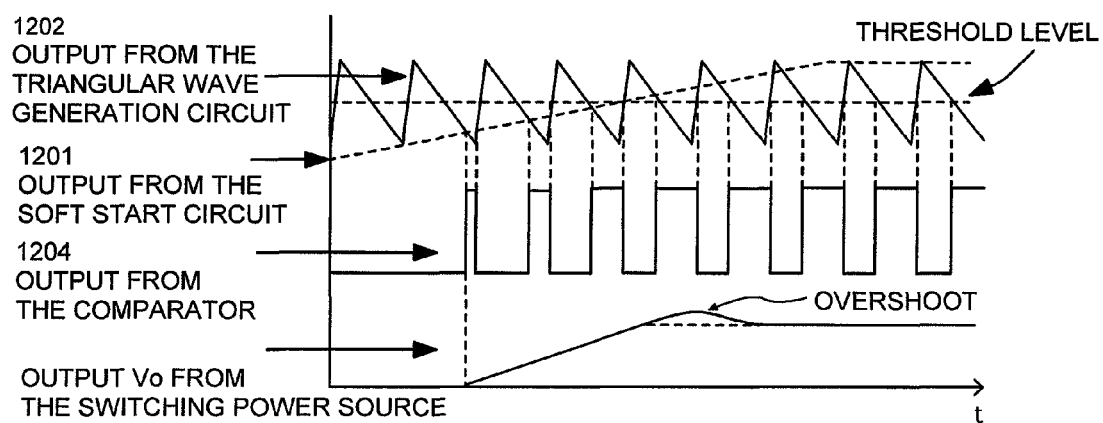
FIG. 20 is an operation waveform diagram of the conventional switching power source 1200.

FIG. 12 and FIG. 13 show experimental results regarding the voltage output from the switching power source controller 500. In FIG. 12, the power source voltage Vcc was 5V, the output voltage Vo_Invert was −5V, the output voltage Vo_Buck was 3.3V, and the output voltage Vo_Boost was 16V. The three voltage outputs were set to rise in the order of Vo_Buck 3.3V, Vo_Invert −5V, and Vo_Boost. It is understood that after the soft start period of about 10 msec., a stable output is obtained for each voltage.

In FIG. 13, the power source voltage Vcc was 9V, the output voltage Vo_Invert was −5V, the output voltage Vo_Buck1 was 5V, and the output voltage Vo_Buck2 was 3.3V. The three voltage outputs were set to rise in the order of Vo_Buck2, Vo_Invert, and Vo_Buck1. It is understood that after the soft start period of about 10 msec., a stable output is obtained for each voltage.

As described above, a switching power source according to the present invention can stably output three power source voltages including a negative voltage and also easily change the rising sequence thereof.

INDUSTRIAL APPLICABILITY

A switching power source according to the present invention has a soft start function and also stably outputs a negative voltage. In addition, a switching power source according to the present invention allows the feedback function in the circuit to be operative from immediately after the power is turned on, prevents the overshoot on the negative side for outputting a negative voltage when the power is turned on, and thus protects the circuit elements on the load circuit side for outputting the negative voltage from being damaged. Therefore, the decrease in the withstand voltage caused by the size reduction of the circuit elements can be handled.

A switching power source according to the present invention can stably output three power source voltages including a negative voltage, and also easily change the rising sequence thereof.

Therefore, a switching power source according to the present invention is applicable to various products requiring a negative voltage output, including liquid crystal displays, organic EL displays and other types of displays.

The invention claimed is:

1. A switching power source, comprising:
a switching power source controller including a soft start circuit;
an output stage for outputting a negative voltage, the output stage including a coil, a switching device, driven by an output from the switching power source controller, for controlling a current flowing in the coil, and a diode having an anode connected to an output terminal and a cathode connected to a connection point between the switching device and the coil;
a voltage dividing circuit for dividing a potential difference between a positive output voltage from the soft start circuit and a negative voltage fed back from the output terminal; and
a soft start period adjustment circuit for outputting a positive voltage to adjust a soft start period to an input section of the soft start circuit immediately after a power source is turned on,
wherein the soft start circuit outputs the positive voltage to set the soft start period and the voltage dividing circuit outputs the divided potential difference to an input section of the switching power source controller.

2. A switching power source, comprising:
a switching power source controller including an error amplifier, a comparator, a triangular wave generation circuit, and a driving circuit;
an output stage for outputting a negative voltage, the output stage including a coil, a switching device, driven by an output from the switching power source controller, for controlling a current flowing in the coil, and a diode having an anode connected to an output terminal and a cathode connected to a connection point between the switching device and the coil;
a voltage dividing circuit for dividing a potential difference between a positive reference voltage and a negative voltage fed back from the output terminal and outputting the divided potential difference to an input section of the error amplifier; and a soft start period adjustment circuit for outputting a positive voltage to adjust a soft start period to an input section of the soft start circuit immediately after the power source is turned on, wherein the soft start circuit outputs a positive voltage to set the soft start period and the switching power source controller connects the soft start circuit and an output section of the triangular wave generation circuit to an input section of the comparator.

3. The switching power source according to claim 1, wherein the switching power source controller further comprises:

an error amplifier,
a triangular wave generation circuit,
a comparator, and
a driving circuit,
wherein the divided potential difference is input to an input section of the error amplifier and the error amplifier outputs a potential difference between the divided potential difference and a reference voltage to an input section of the comparator immediately after the power source is turned on.

4. A switching power source, comprising:

a switching power source controller including a soft start circuit;

a plurality of output stages including an output stage for outputting a negative voltage, wherein the output stage for outputting a negative voltage includes a coil, a switching device, driven by an output from the switching source controller, for controlling a current flowing in the coil, and a diode having an anode connected to an output terminal and a cathode connected to a connection point between the switching device and the coil;

a plurality of voltage dividing circuits for dividing a potential difference between a positive output voltage from the soft start circuit and respective voltages fed back from the respective output terminals of the plurality of output stages;

a plurality of soft start period adjustment circuits for outputting a positive voltage to adjust each soft start period of the plurality of output stages to an input section of the switching power source controller immediately after the power source is turned on; and a switching circuit for switching a rising sequence of the plurality of output stages, wherein the soft start circuit outputs a positive voltage to set the soft start period and the voltage dividing circuits output the divided potential difference to an input section of the switching power source controller.

5. The switching power source according to claim 1, wherein the soft start circuit comprises a clamp circuit which clamps the positive voltage input from the soft start period adjustment circuit immediately after the power source is turned on.

6. The switching power source according to claim 1, wherein the soft start circuit outputs the positive voltage setting the soft start period to the voltage dividing circuit by the positive voltage input from the soft start period adjustment circuit immediately after the power source is turned on;

the voltage dividing circuit outputs the divided potential difference to the input section of the switching power source controller immediately after the power source is turned on; and the switching power source controller drives and controls the switching device to control the negative voltage fed back from the output terminal by a potential difference between the divided potential difference input from the voltage dividing circuit and a reference voltage during the soft start period and after the soft start period.

7. The switching power source according to claim 2, wherein the error amplifier has a P-channel transistor or a PNP transistor in an input section thereof and has a clamp function for clamping the positive voltage output from the soft start circuit.

8. The switching power source according to claim 2, wherein the soft start circuit outputs the positive voltage setting the soft start period to the comparator by the positive voltage input from the soft start period adjustment circuit immediately after a power source is turned on, the voltage dividing circuit outputs the divided potential difference to the input section of the switching power source controller, the comparator compares an output voltage from the error amplifier, an output voltage from the soft start circuit, and an output voltage from the triangular wave generation circuit and outputs a comparison result output from the comparator to the input section of the error amplifier, and the driving circuit drives the switching device to control the negative voltage fed back from the output terminal by the comparison result input from the comparator after the soft start period.

* * * * *